United States Patent
Ogawa

[19]
[11] Patent Number: 6,103,047
[45] Date of Patent: Aug. 15, 2000

[54] THREE DIMENSIONAL MOLDED BODY USING URETHANE ELASTOMER AND METHOD FOR MANUFACTURING THE SAME

[75] Inventor: Taro Ogawa, Kurashiki, Japan

[73] Assignee: Namba Press Works Co., Ltd., Kurashiki, Japan

[21] Appl. No.: 08/875,016

[22] PCT Filed: Oct. 21, 1996

[86] PCT No.: PCT/JP96/03045

§ 371 Date: Jun. 25, 1997

§ 102(e) Date: Jun. 25, 1997

[87] PCT Pub. No.: WO97/15441

PCT Pub. Date: May 1, 1997

[30] Foreign Application Priority Data

Oct. 27, 1995 [JP] Japan .................................. 7/302258

[51] Int. Cl.$^7$ .................................................. B29C 47/00
[52] U.S. Cl. ...................... 156/245; 156/323; 264/259; 264/265; 442/181; 442/286; 442/FOR 122; 442/FOR 121
[58] Field of Search .................... 264/265, 259; 442/181, 286, FOR 122, FOR 121; 156/323, 245

[56] References Cited

U.S. PATENT DOCUMENTS 3,660,218   5/1972   Shepherd ............................. 442/286
4,849,145   7/1989   Hirsch .................................. 264/265
5,389,318   2/1995   Thary .

FOREIGN PATENT DOCUMENTS 45421   2/1982   European Pat. Off. ...... 442/FOR 122

*Primary Examiner*—John J. Gallagher
*Attorney, Agent, or Firm*—Renner, Kenner, Greive, Bobak, Taylor & Weber

[57] ABSTRACT

A three dimensional molded body which is thin and has an excellent shape-maintainability and a method for manufacturing the three dimensional molded body, which is low in cost and high in productivity. An urethane elastomer (33), which comprises a non-foamable type of a reactive mixture, is integrally pressurized and compressed by an upper portion of a mold and a lower portion thereof, which have predetermined shapes, respectively, when the urethane elastomer is still in a visco-elastic flowing condition during the reaction thereof. The urethane elastomer is transformed into a solid body and is fixed on a back surface of the surface material. A backing material (34) is provided on a whole of a back surface of the urethane elastomer so that the backing material can be completely fixed on the urethane elastomer during the reaction thereof. A natural leather or a synthetic leather is used for the surface material (32). A bag body is integrally molded in three dimensions together with a three dimensional pattern (31).

4 Claims, 5 Drawing Sheets

THREE DIMENSIONAL MOLDED BODY USING URETHANE ELASTOMER AND METHOD FOR MANUFACTURING THE SAME

FIELD OF THE INVENTION

The present invention relates to a technique for molding a surface material in three dimensions and, in particular, relates to a technique for manufacturing a relatively thin three dimensional molded body which has restrained cushioning ability and is used for articles relevant to apparel industries, bags, carpets and the like.

BACKGROUND OF THE ART

A method for molding a plain cloth in three dimensions is known in the art. For example, U.S. Pat. No. 5,296,182 or 5,389,318 discloses a method of an integral molding carried out by using a reaction of a polyurethane foam which is a typical liquid foamable mixture. In such a method, while a gasification reaction of the liquid foamable mixture is completed so that the liquid foamable mixture is solidified, polyurethane and a plain cloth as a surface material are integrally molded by a pressure in a mold which has an upper portion and a lower portion having predetermined shapes, respectively. After the polyurethane is pressurized and compressed in the mold for a certain period, the pressurized and compressed polyurethane is transformed into a solid body, and as a result, a three dimensional molded body having a desired pattern can be produced.

Such a method for molding in three dimensions in accordance with the art has been widely applied to several techniques for printing in three dimensions to print a pattern on a surface of a surface material such as shirts, jeans, jackets and the like.

However, there are several problems in such a method of the art, as follows.

As a problem, in a method for molding in three dimensions in accordance with the art, polyurethane is used because the cushioning ability is important so that a thickness thereof is required to be large. Thus, such a method of the art which uses polyurethane is not suitable for applying a thin plain cloth, a carpet and the like.

As another problems, polyurethane foam used in the art is not suitable for a mass production, because most of such methods in the art are carried out by a dispensing method, and the productivity is lowered thereby.

As still another problem, when a large three dimensional molded body is produced by polyurethane used in the art, it is necessary to coat uniformly and rapidly a foamed body, which has a rising height with a relatively large thickness (preferably, 20 mm), over a whole of a surface thereof in order to obtain the stiffness. However, it is difficult to coat uniformly and rapidly the urethane foam by the dispensing method in the art. Thus, a rate of the reaction varies locally in the coated urethane foam, so that there are portions where the reaction has not been started and portions where the reaction has been started in the coated urethane foam, and it is almost impossible to accurately take a pressurization-timing thereby. As a result, the shape of the resulting three dimensional molded body is injured (or deformed) and a relationship in contact between the urethane and the surface material is worse.

As still another problem, when a foamed body of a urethane foam used in the art is pressurized and compressed, a surface of a surface material is pushed up by gas retained under a back side of the surface material if gas contained in the foamed body is not completely removed, so that projections can be formed on the surface of the surface material, and as a result the shape thereof is injured.

As still another problem, because it takes a long time to transform a urethane foam used in the art into a solid body, a working operation is strained to stop during the period for this transformation, and the working efficiency is lowered thereby.

Therefore, an object of the present invention is to provide a relatively thin three dimensional molded body, which has an excellent shape-maintainability and can be applied for carpets, bags and the like which do not need the cushioning ability.

Another object of the present invention is to provide a method for manufacturing a three dimensional molded body which has a shape-maintainability and can easily take a pressurization-timing when producing a relatively large three dimensional molded body.

Still another object of the present invention is to provide a method for manufacturing a three dimensional molded body which can improve productivity and can reduce cost for the production.

DISCLOSURE OF THE INVENTION

In order to achieve those objects, the present invention comprises means as mentioned in the following.

A three dimensional molded body relevant to the present invention is manufactured by: integrally pressurizing and compressing a urethane elastomer, which is a non-foamable type of a reactive mixture, together with a surface material in a mold having an upper and a lower portions having predetermined shapes, respectively; and transforming the pressurized and compressed urethane elastomer into a solid body and fixing the urethane elastomer on a back surface of the surface material. The urethane elastomer is pressurized and compressed together with the surface material in the mold when the urethane elastomer is still in a visco-elastic flowing condition.

In general, a non-foamable urethane is called a urethane elastomer. In addition, a meaning of a term "integrally pressurizing and compressing" is to pressurize, compress and mold by an upper portion of a mold and a lower portion of the mold. With reference to the drawings, those portions of the mold are corresponding to an upper portion indicated by 51 and a lower portion indicated by 58, respectively.

In the three dimensional molded body relevant to the present invention, the urethane elastomer is fixed on a part of or a whole of the back surface of the surface material to mold a part of the surface material in three dimensions.

Alternatively, in the three dimensional molded body relevant to the present invention, the urethane elastomer is fixed on a whole of the back surface of the surface material to mold a whole of the surface material in three dimensions.

In addition, the three dimensional molded body relevant to the present invention may have a backing material, and a whole of the urethane elastomer is substantially covered with the backing material.

A textile material laminated with a thermoplastic film on one surface thereof or laminated with a foamed slab urethane on one surface thereof is preferably used as the backing material.

A woven fabric sheet or a knitted fabric sheet, a synthetic leather sheet, a natural leather sheet, a tufted carpet, or a needle punched carpet is preferably used for the surface material.

A thermoplastic film is preferably laminated on the back surface of the surface material.

A pattern may be printed on the surface of the surface material, and, as such a pattern printed thereon, a pattern corresponding to a shape of the surface material formed in three dimensions is preferable.

A method for manufacturing a three dimensional molded body comprising a surface material and a urethane elastomer layer fixed on a back surface of the surface material, in accordance with the present invention, comprises the steps of:

horizontally positioning a flat resilient sheet;

coating a reactive mixture of a liquid urethane elastomer on the resilient sheet by spraying the reactive mixture;

placing the surface material covering the reactive mixture of a liquid urethane elastomer;

integrally pressurizing and compressing the resilient sheet, the urethane elastomer and the surface material in a mold having an upper portion of the mold having a shape corresponding to a front surface shape of the three dimensional molded body and a lower portion thereof having a shape corresponding to a back surface shape of the three dimensional molded body when the urethane elastomer is still in a visco-elastic flowing condition after elapsing a certain period after spraying the urethane elastomer; and transforming the urethane elastomer into a solid body and fixing the solid body as the urethane elastomer layer on the back surface of the surface material by continuing the step of integrally pressurizing and compressing for a certain period.

This method of the present invention further includes a step of mounting a backing material in the form of a textile material on the resilient sheet, where a plastic film or a foamed slab material is laminated on one surface of the textile material and the textile material is mounted on the resilient sheet by facing upward a surface of the plastic film or the foamed slab material of the fiber material.

In this method of the present invention, a silicone rubber is preferably used for the resilient sheet.

In this method of the present invention, without use of the resilient sheet, a reactive mixture of the liquid urethane elastomer may be sprayed directly on the back surface of the surface material.

In this method of the present invention, without use of the resilient sheet, the reactive mixture of the liquid urethane elastomer may be sprayed directly on the lower portion of the mold.

BEST MODE FOR CARRYING OUT THE INVENTION

We now consider preferred embodiments of the present invention with reference to the drawings. A three dimensional molded body of the present invention can be applied for several fields and is applied for a thicken at jumper as the first preferred embodiment, a carpet or a wall cloth as the second preferred embodiment and a leather bag as the third preferred embodiment, as described in the followings.

Figure 1A:
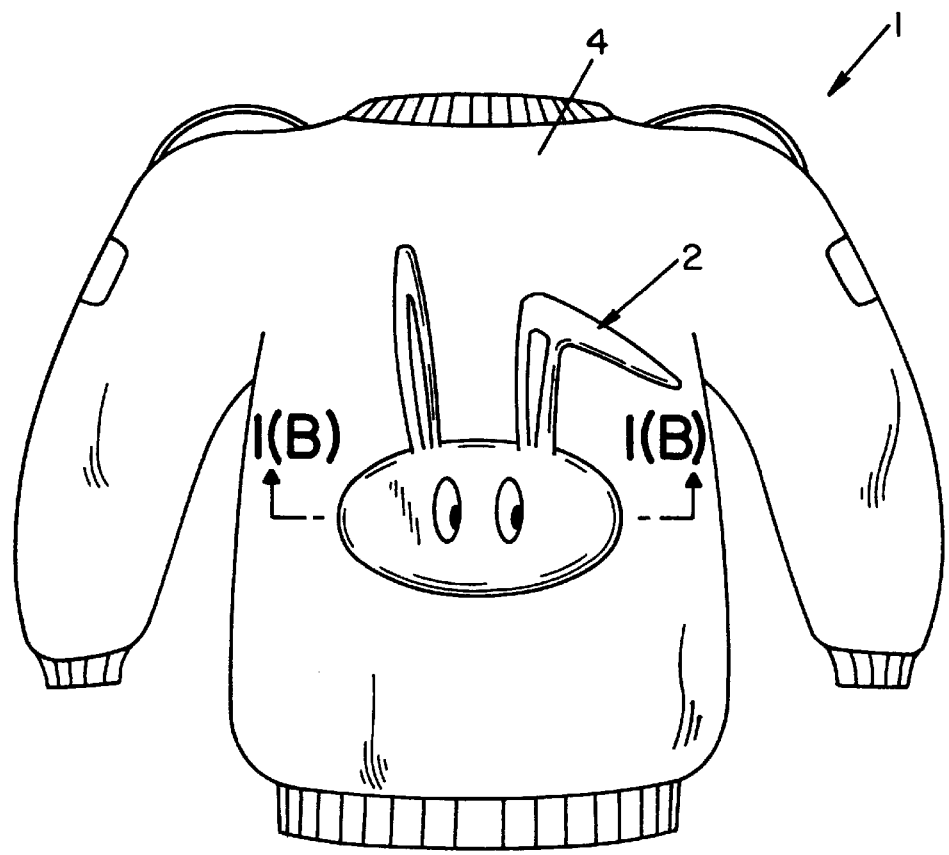
FIG. 1(A) is an outline of the first preferred embodiment of a three dimensional molded body according to the present invention.
Figure 1B:
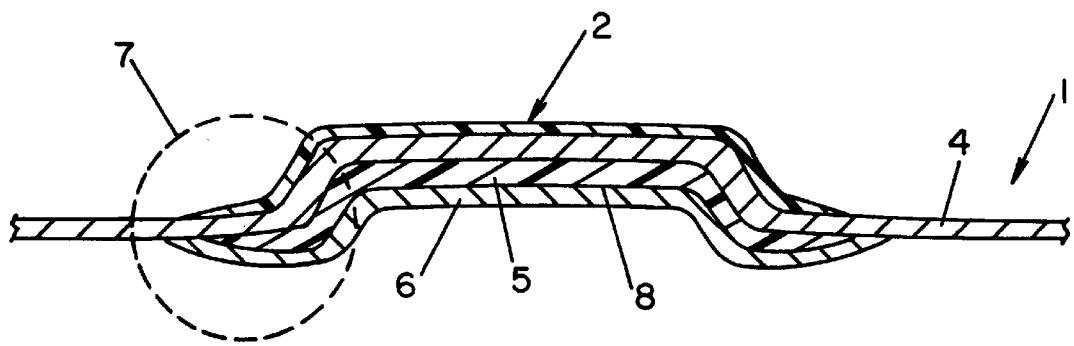
FIG. 1(B) is an enlarged cross sectional view thereof taken substantially along line 1(B)—1(B) of FIG. 1(A).

FIG. 1(B) shows the first preferred embodiment wherein a three dimensional molded body is provided on a jumper 1 in accordance with the present invention. FIG. 1(B) shows an enlarged cross sectional view taken along line 1(B)—1 (B) of FIG. 1(A).

A three dimensional molded body, generally indicated by the numeral 2, according to the present invention is manufactured by integrally pressurizing and compressing a urethane elastomer 5, which is a non-foamable type of a reactive mixture, together with a surface material 4 by an upper portion of a mold and a lower portion thereof having predetermined shapes, respectively, when the urethane elastomer is still in a visco-elastic flowing condition during the reaction of the urethane elastomer and by transforming the pressurized and compressed urethane elastomer into a solid body and fixing the urethane elastomer on the back side of the surface material (a method for manufacturing this three dimensional molded body is described later). With reference to FIG. 1(B), the first preferred embodiment according to the present invention is comprised of: a surface material 4 having a pattern 4 printed on a surface thereof, the pattern 4 having a shape corresponding to the three dimensional shape; a urethane elastomer 5, which is fixed on a back side of the surface material and is molded in three dimensions, corresponding to the pattern printed on the surface of the surface material; and a backing material 6 fixed thereon so that the urethane elastomer is substantially covered with the backing material.

The surface material 4 may be selected from several fabric sheets such as a woven fabric sheet, a knitted fabric sheet, a nonwoven fabric sheet and the like, or may be made of vinyl chloride. In this preferred embodiment, while the pattern 4 printed on the surface of the surface material is usually provided only in a three dimensional area, such a pattern may be provided over a whole of the surface material. This pattern is usually provided in advance on the surface of the surface material by using a hot iron and the like.

The urethane elastomer 5 results in a solid body molded by pressurizing and compressing a non-foamable polyurethane in accordance with a method of the present invention described later.

We now briefly describe about a urethane elastomer. In general, a urethane product is mainly made from two kinds of liquid such as polyol and isocyanate and is produced by a chemical reaction caused by mixing those liquids with a catalyst, a foaming agent, a foam-adjusting agent, water and the like. This chemical reaction is caused by a gasification reaction (a foaming reaction) producing $CO_2$ and a solidification reaction transforming from a state of liquid to a state of solid through a state of gel. A urethane elastomer used in the present invention is a polyurethane produced to restrain the foaming reaction. As a detailed explanation, water and a foam-adjusting agent are not included in a preparation of the urethane elastomer, and as a result, a gasification reaction of water and isocyanate is restrained. The thickness of the urethane elastomer 5 is selectable, preferably 2 to 3 mm, and depends on a clearance of convex and concave portions formed in an upper and a lower portions of a mold. While in an application for the preferred embodiment and T-shirts the urethane elastomer 5 is fixed as a fixed area thereof is equal to or slightly greater than a printed area of the pattern, the urethane elastomer may be fixed over a whole of a back surface of the surface material 4.

A textile material with a plastic film 8 laminated on one surface thereof is preferably used as the backing material 6. This plastic film 8 is a thermoplastic material, which is not penetrated by liquid, such as nylon, polyester and the like, and the thickness thereof is from 10 $\mu$m to 1 mm (preferably, 50 $\mu$m). A woven fabric, a knitted fabric, a nonwoven fabric and the like is used for the textile material. An outline of the backing material 6 is circumferentially about 20 to 30 mm greater than an outline of a printed pattern and the backing material 6 is disposed as indicated by 7 so that the urethane elastomer 5 can be substantially covered with the backing material 6. The backing material 6 is fixed on the back surface of the surface material by melting the plastic film 8 having about 10 to 20 mm of a circumferential band area at about 20° C. for about 20 seconds or is fixed thereon by an adhesive. While the backing material 6 is disposed to cover only with the printed area in this preferred embodiment, the backing material 6 may be fixed over a whole of the back surface of the surface material. Alternatively, a foamed slab material may be used instead of the plastic film 8. The foamed slab material is defined as a thin slab foamed body of a soft urethane foam, a foamed polypropylene or a foamed polyethylene. The foamed slab material is resilient and is preferably used for a buffer material.

Figure 2A:
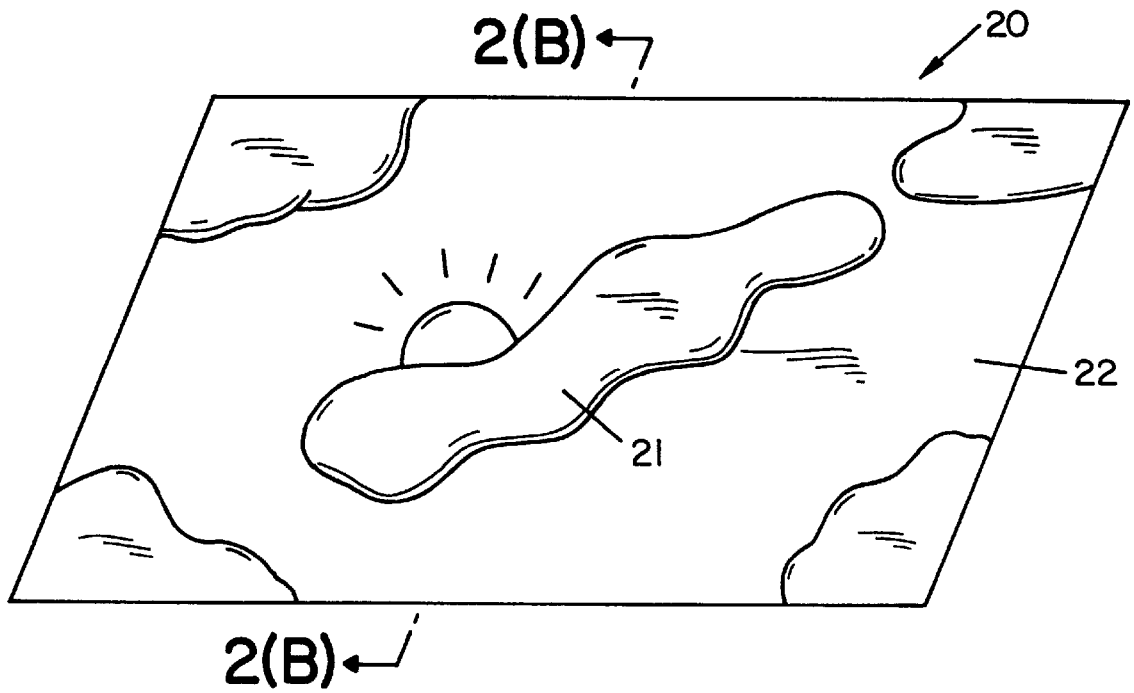
FIG. 2(A) is an outline of the second preferred embodiment of a three dimensional molded body according to the present invention.
Figure 2B:
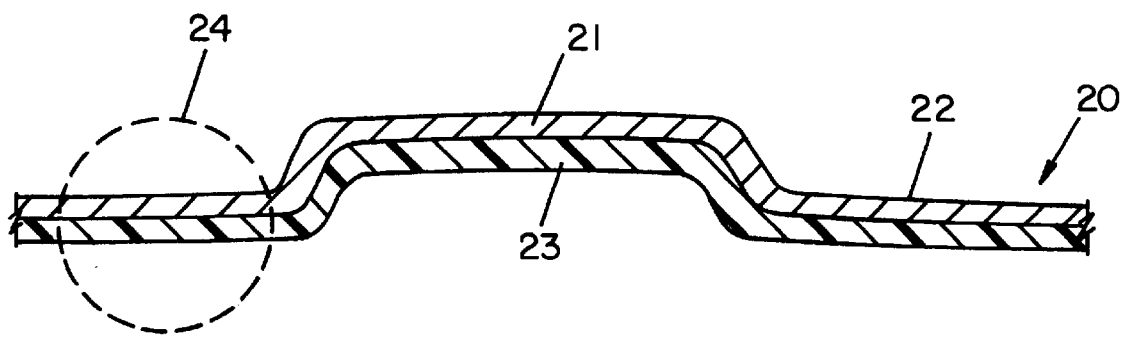
FIG. 2(B) is an enlarged cross sectional view taken substantially along long 2(B)–2(B) of FIG. 2(A).

FIG. 2(A) shows the second preferred embodiment in which a three dimensional molded body of the present invention is provided in a carpet 20. FIG. 2(B) shows an enlarged cross sectional view along line 2(B)—2(B) of FIG. 2(A).

The three dimensional molded body relevant to the second preferred embodiment is comprised of a surface material 22 and an urethane elastomer 23.

A tufted carpet or a needle punched carpet is used for the surface material 22. While a colored pattern 21 is provided on a surface of the surface material 22, as shown in FIG. 2(A), in this preferred embodiment, any patterns may not be provided thereon. The carpet 20 is molded in three dimensions so that a three dimensional shape of the carpet 20 corresponds to the colored pattern 21 provided over the carpet 20. The urethane elastomer is fixed over a whole of a back surface of the surface material 22 to hold and support the three dimensional shape. Thus, the urethane elastomer is also uniformly fixed over a flat part 24 other than a three dimensional molded body so that crumpling of the carpet can be prevented thereby. The urethane elastomer has the same ingredients and instructions as those of the first preferred embodiment.

While the urethane elastomer is fixed over a whole of the back surface of the surface material in this preferred embodiment, the urethane elastomer can be fixed only over a portion molded in three dimensions so that a light-weight carpet can be made. Moreover, while a back surface of the urethane elastomer 23 is not treated, the back surface thereof may be treated by using a backing material laminated with a foamed slab material as mentioned in the first preferred embodiment, so that a feeling of the hard urethane elastomer can be eased.

Figure 3A:
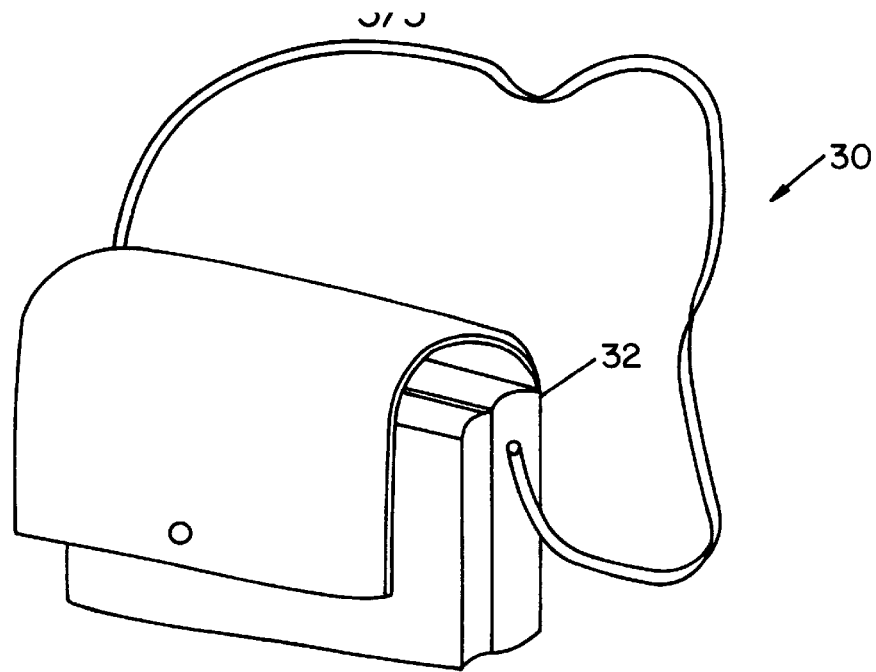
FIG. 3(A) is a perspective view of a third embodiment that may accomadate a three dimensional molded body
Figure 3B:
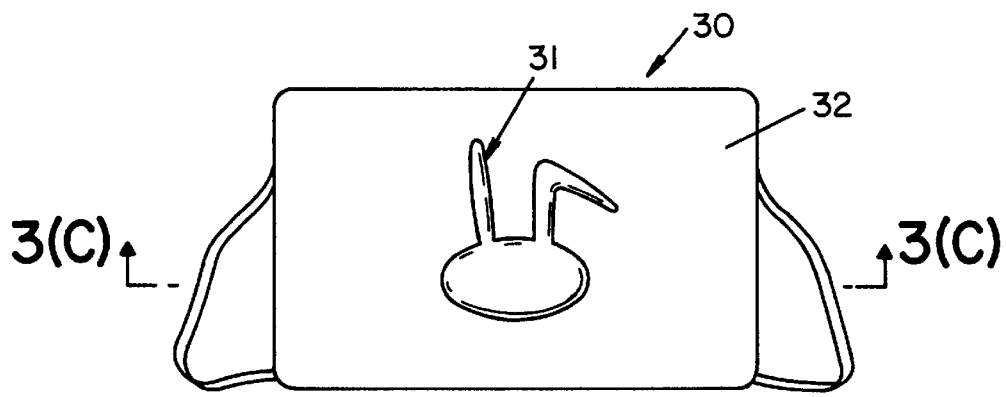
FIG. 3(B) is a rear elevation thereof showing a three dimensional molded body according to the present invention.

FIG. 3(A) is a perspective view of a bag 30 made of a leather or a synthetic leather, and FIG. 3 (B) shows the third preferred embodiment in which a three dimensional molded body 31 according to the present invention is provided on a back surface 32 of the bag. FIG. 3 (C) shows an enlarged cross sectional view along line 3C—3C of FIG. 3(B).

The three dimensional molded body 31 of the third preferred embodiment is comprised of a surface material 32, a urethane elastomer 33 and a backing material 34.

A natural leatherbor a synthetic leather is used for the surface material 32. Preferably, a thermoplastic film is laminated on a back surface of the surface material. While patterns and the like are usually not provided on a front surface of the surface material 32 in order to emphasize that a material used for the surface material has an excellent quality, a pattern similar to that of the first preferred embodiment is provided in this embodiment. Accordingly, the three dimensional molded body 31 has a shape in that a part of the leather is slightly raised to obtain a feeling of high grade to the bag so that a consumer's will to purchase can be heightened. The urethane elastomer 33 is fixed on a whole of the back surface of the surface material 32. The urethane elastomer has the same ingredients and instructions as those of the first preferred embodiment. The backing material 34 is preferably attached on a whole of the back surface of the urethane elastomer 33. The backing material 34 is preferably a textile material, where a foamed slab is laminated on one surface thereof.

Figure 3C:
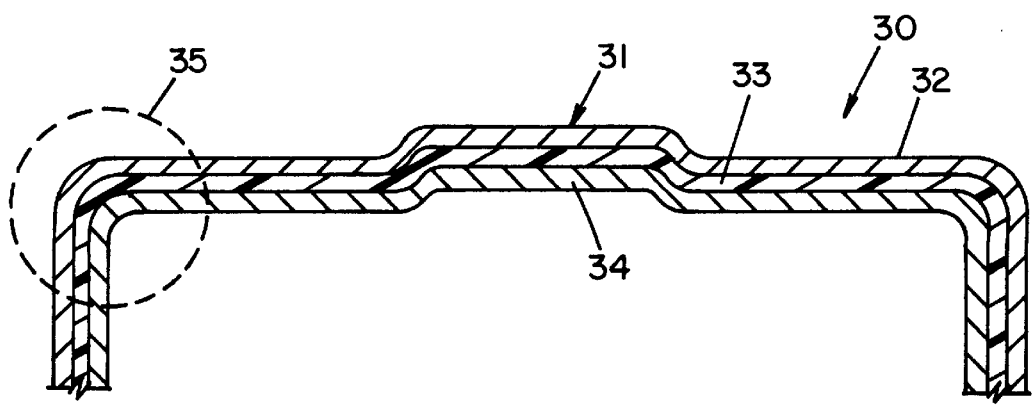
FIG. 3(C) is an enlarged cross sectional view thereof taken substantially along line 3(C)—3(C) of FIG. 3(B).

This preferred embodiment is characterized in that not only a pattern provided on a surface of the bag is molded in three dimensions but also a whole body of the bag is molded in three dimensions. That is, this can be achieved by simultaneously molding corners (as indicated by 35) of the bag in three dimensions as shown in FIG. 3(C). Accordingly, even though the surface material 32 is a relatively thin leather, it is possible to maintain a shape of the bag, so that a shape of the bag is not injured. Also, an excellent water-proof can be obtained.

With reference to several preferred embodiments, representative applications of a three dimensional molded body according to the present invention have been described. The three dimensional molded body of the present invention can be applied to other embodiments as follows. For example, a three dimensional molded body of the present invention can be applied instead as an emblem provided on a cap. Also, a three dimensional molded body of the present invention can be employed for several applications such as an ornamental picture, an inner bottom portion and a side surface of a shoe or a boot, a pattern on a splat of a seat and the like.

We now consider a method for manufacturing a three dimensional molded body according to the present invention. As a representative example, a method for manufacturing a three dimensional molded body of the first embodiment shown in FIG. 1.

A method for manufacturing a three dimensional molded body comprising a surface material and an urethane elastomer fixed on a back surface of the surface material comprises the steps of: horizontally positioning a flat resilient sheet (1st step); mounting a backing material in the form of a textile material on the resilient sheet, so that a surface of a plastic film or a foamed slab material laminated on one surface of the textile material is faced upward (2nd step); coating a reactive mixture of a liquid urethane elastomer on the surface of a plastic film or a foamable slab material by spraying the reactive mixture thereon and placing the surface material covering the reactive mixture of a liquid urethane elastomer (3rd step); integrally pressurizing and compressing the surface material, the urethane elastomer, the textile material and the resilient sheet in an upper portion of a mold and a lower portion of the mold when the urethane elastomer is still in a visco-elastic flowing condition after elapsing a certain period after spraying the urethane elastomer on the flat resilient sheet, the upper portion having a shape corresponding to a three dimensional front surface shape of the three dimensional molded body and the lower portion having a shape corresponding to a three dimensional back surface shape of the three dimensional molded body (4th step); and transforming the urethane elastomer into a solid body and fixing the urethane elastomer on the back surface of the surface material, by continuing the step of integrally pressurizing and compressing for a certain period (5th step).

Figure 4A:
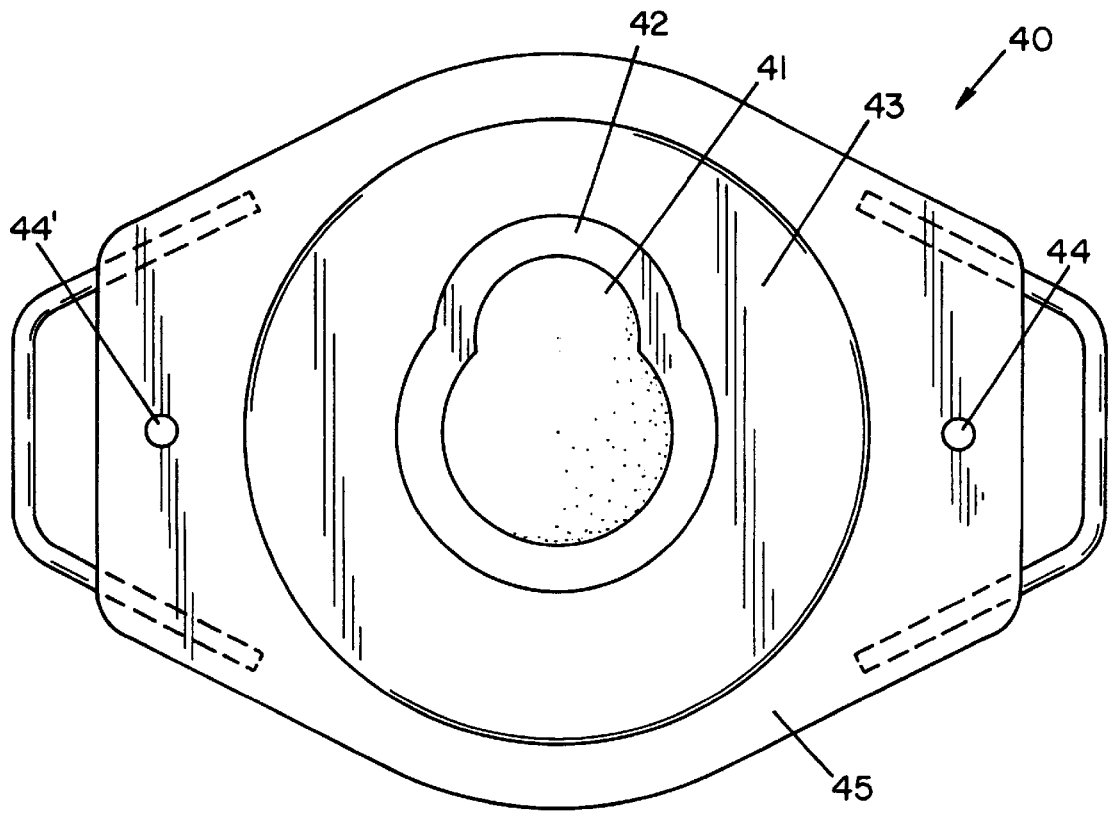
FIG. 4(A) is schematic drawings of a plan view and FIG. 4(B) a side view of an urethane elastomer mounting tool used for a method for manufacturing a three dimensional molded body in accordance with the present invention.
Figure 4B:
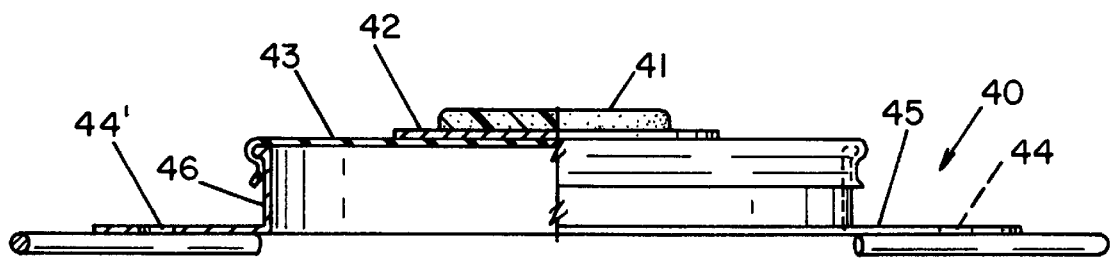
Figure 5:
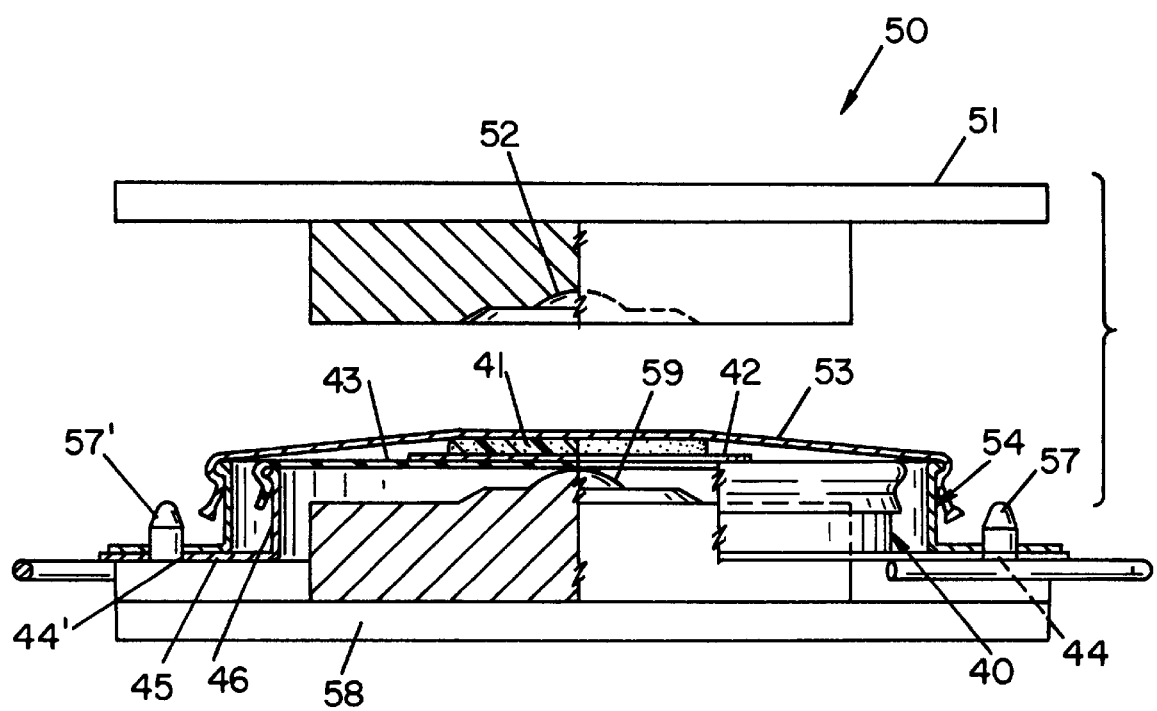
FIG. 5 is a schematic drawing of a tool used for a method for manufacturing a three dimensional molded body in accordance with the present invention and shows an integral pressurization and compression done by an upper portion of a mold and a lower portion thereof.

FIGS. 4(A), 4(B) and 5 shows equipment for manufacturing a three dimensional molded body according to the present invention.

FIGS. 4(A) and 4(B) show a plan and a side views of a urethane elastomer mounting tool used in the steps of horizontally positioning a flat resilient sheet (1st step); mounting a textile material on the resilient sheet, so that a surface of a plastic film or a foamable slab material laminated on one surface of the textile material is faced upward (2nd step); coating a reactive mixture of a liquid urethane elastomer on the surface of a plastic film or a foamable slab material by spraying the reactive mixture thereon (3rd step). The urethane elastomer mounting tool 40 comprises a cylindrical portion 46 and a flange portion 45 extending outward from one end of an opening of the cylindrical portion. At least two holes 44, 44' are provided on the flange portion 45, and those holes can be set with at least two pins 57, 57' provided on a lower portion 58 of a mold as shown in FIG. 5, so that the urethane elastomer mounting tool 40 can be positioned and attached on the lower portion 58. In accordance with the present invention, a resilient sheet 43 is positioned with a uniform tension on a top surface of the urethane elastomer mounting tool 40. This resilient sheet 43 has an excellent resiliency and a restoring ability and is made of a material capable of easily separating from the urethane elastomer. A silicone rubber with 0.5 mm in thick is preferably used for this resilient sheet 43. Also, a natural rubber or other synthetic rubbers may be used for the resilient sheet 43.

In accordance with a method for manufacturing a three dimensional molded body of the present invention, firstly, the urethane elastomer mounting tool 40 of FIG. 4 is horizontally positioned and fixed. Then, a textile material 42 is mounted on the resilient sheet 43. Then, a plastic film or a foamed slab laminated on one surface of the textile material 42 is faced upward. The size of the textile material 42 is about 25 mm greater than that of an outline of a pattern to be printed. Then, a masking tool (not shown) is attached on the urethane elastomer mounting tool 40, and a non-foamable liquid mixture of a urethane elastomer is sprayed toward a surface of the plastic film or the foamed slab.

We now explain about means for spraying used in the present invention. The liquid non-foamable mixture is mainly made from isocyanate (ISO) and polyol (POLY) and is a mixture of ISO, POLY, a catalyst, a foaming agent and a cross linking agent. Such a mixing is carried out by spraying, with a high pressure, "solution A" consisting of isocyanate and "solution B" consisting of polyol, a catalyst and the like. Thus, in order to spray the mixture, each material of the mixture must have a low viscosity. In the present invention, those solutions A and B are at 60° C. and 70° C. in a tank before mixing them and are then heated up to 70° C. and 85° C. in a circulation pipe, respectively. In order to achieve a desired chemical reaction, oxidation, decomposition, evaporation and the like must not occur in each material at such a high temperature. That is, the boiling point of each material should be greater than 100° C. Thus, each material is carefully selected so that those conditions can be satisfied. Specifically, as materials used for the urethane elastomer of the present invention, special MDI series or prepolymer series is preferably used for isocyanate, and polyeterpolyol of functional group 3–6, hydroxyl group 24–56 and molecular weight 2000–10000 is preferably used for polyol. Also, an amine catalyst of strong base or a metallic catalyst of a heat resistant tin catalyst is preferably used for the catalyst, and a cross linking agent has a large hydroxyl group. A conventional apparatus such as PSM80 (ISOPTHERM Co.) can be used as an apparatus for spraying. The solutions A and B are sprayed, with a high pressure (130 kg/cm² each), from separated outlets of the mixing head, respectively, and are mixed and atomized so that an urethane elastomer mixture is coated on a workpiece. After the liquid urethane elastomer mixture is coated, the masking tool is immediately removed from the urethane elastomer mounting tool 40. As a result, the urethane elastomer 41 having a desired shape is formed on the textile material 42.

FIG. 5 shows a mold 50 having an upper portion 51 and a lower portion 58 used for the step of integrally pressurizing and compressing. The upper portion 51 and the lower portion 58 are preferably made of aluminium and are fabricated so that a concave portion 52 of the upper portion and a convex portion 59 are corresponding to a shape of a pattern to be printed. As shown in FIG. 5, the urethane elastomer mounting tool 40 and a surface material mounting tool 54 of FIG. 4 is attached on the lower portion 58, by inserting pins 57, 57' of the lower portion 58 into the holes of each tool.

Note that a pressurization-timing for the liquid urethane elastomer is important. The pressurization-timing is defined as a time interval of a visco-elastic condition from an initial state of gel of the urethane elastomer until solidification thereof has just started (called as tack free). As mentioned in the above, the chemical reaction of polyurethane is a gasification reaction and a solidification reaction followed thereby. However, the urethane elastomer used in the present invention is characterized in that the gasification reaction is restrained not to foam so that the urethane elastomer is directly solidified. As a result, a duration required for a foaming reaction according to the art is reduced, and an initial state of gel is started earlier than that of use of the foamed urethane used in the art. According to the present invention, the pressurization-timing is 20 to 40 seconds, preferably 30 seconds.

Some problems will be caused by mistaking the pressurization-timing as follows. If the pressurized molding has been carried out before the urethane elastomer is transformed into a state of gel, the urethane elastomer still in a state of liquid may be percolated on the surface of the surface material, and an outline of a product is considerably injured thereby. Also, such a percolation of the urethane elastomer which has not been reacted will affect a human body. Meanwhile, if the pressurized molding is carried out after the tack free, the adhesion between the urethane elastomer and the back surface of the surface material will be worse, and thereby the urethane elastomer layer will be separatable therefrom and will not be fixed thereon. Thus, the pressurization-timing of the pressurized molding must be carefully and rapidly carried out and is started in the state of gel until the tack free, when the urethane elastomer is still in a visco-elastic condition.

In accordance with 4th and 5th steps of the present invention, during the pressurization-timing, the resilient sheet 43, the textile material 42, the liquid urethane elastomer 41 and the surface material 53 are integrally pressurized and compressed by the convex portion 52 of the upper portion 51 and the concave portion 59 of the lower portion 58. Where, on one surface of the textile material 42, a plastic film or a foamed slab is laminated preferably, such a pressurization is carried out by applying 942 kg force (3 $kg/cm^2 \times 200$ mm $\phi$) for 1 to 3 minutes (preferably, 2 minutes). For this period, the urethane elastomer is transformed into a solid body so that the urethane elastomer is fixed on the back surface of the surface material 53 and is fixed simultaneously on the plastic film or the foamed slab of the backing material 42. Then, in order to treat the back surface of the surface material, the surface material 53 is removed from the tools, and then, a front surface of a shirt is heated at about 40° C. and a back surface thereof is heated at about 200° C. by pressurizing a hot iron (not shown) thereon for about 20 seconds, and thereby the plastic film or the foamed slab laminated about the circumferential end portion of the textile material 42 is melted and is fixed on the back surface of the surface material 53 to completely seal the whole of the urethane elastomer.

In a method for manufacturing a three dimensional molded body in accordance with the present invention, if the backing material is not necessary, the urethane elastomer can be sprayed directly on the resilient sheet. Alternatively, if the resilient sheet is not used as mentioned about a method for manufacturing a carpet relevant to the second preferred embodiment of FIG. 2, preferably, the urethane elastomer can be sprayed directly on the back surface of the surface material or the lower portion of the mold.

As the first effect of the present invention, by according to the present invention, a three dimensional pattern which is relatively thin and has a shape-maintainability can be formed on an article, which is unnecessary to have the cushioning ability, such as a carpet, a bag and the like.

As the second effect of the present invention, by according to the present invention, a whole body of a bag made of a leather, a synthetic leather and the like can be integrally molded with a three dimensional pattern.

As the third effect of the present invention, by according to the present invention, because the urethane elastomer is sprayed, the pressurization-timing can be taken more easily than that of the foamed body according to the art, and the duration until the pressurization can be reduced, and the working efficiency and the productivity can be improved thereby.

As the fourth effect of the present invention, by according to the present invention, when a silicone rubber, which has an excellent resiliency, the restoring ability and the separating ability, is used as a resilient sheet, the resilient sheet can be used repeatedly, and thereby the manufacturing cost can be considerably reduced in comparison with the art and the throughput can be improved.

I claim.

1. A method for manufacturing a three dimensional molded body comprising a surface material and a non-foamable urethane layer fixed on a back surface of said surface material, comprising steps of:

horizontally positioning a flat resilient sheet;

mounting a textile material on said resilient sheet so that a surface of a plastic film or a foamable slab material laminated on one surface of said textile material is faced upward;

coating a reactive mixture of a non-foamable liquid urethane on said surface of said plastic film or said foamable slab material by spraying said reactive mixture thereon;

placing said surface material on said liquid urethane elastomer so that said surface material covers said non-foamable liquid urethane on said flat resilient sheet;

integrally pressurizing and compressing said surface material, said urethane, said textile material and said resilient sheet by an upper portion of a mold and a lower portion of said mold when said non-foamable liquid urethane is still in a visco-elastic flowing condition after elapse of certain period after spraying said liquid urethane, said upper portion having a shape corresponding to a three dimensional front surface shape of said three dimensional molded body and said lower portion having a shape corresponding to a three dimensional back surface shape of said three dimensional molded body; and transforming said non-foamable liquid urethane into a solid body and fixing said solid body as said non-foamable liquid urethane layer on said back surface of said surface material and said surface of the plastic film or the foamable slab material, by continuing said step of integrally pressurizing and compressing for a certain period.

2. A method of claim 1 wherein said resilient sheet is made of a silicone rubber.

3. A method for manufacturing a three dimensional molded body comprising a surface material and a non-foamable urethane layer fixed on a back surface of said surface material, comprising the steps of:

coating a reactive mixture of a non-foamable liquid urethane directly on said back surface of said surface material which is horizontally held by spraying said reactive mixture thereon;

placing a backing material on said liquid urethane elastomer so that said backing material covers said non-foamable liquid urethane on said surface material;

integrally pressurizing and compressing said surface material, said non-foamable liquid urethane and said backing material by an upper portion of a mold and a lower portion of said mold when said non-foamable liquid urethane is still in a visco-elastic flowing condition after elapse of a certain period after spraying said non-foamable liquid urethane on said flat resilient sheet, said upper portion having a shape corresponding to a three dimensional front surface shape of said three dimensional molded body and said lower portion having a shape corresponding to a three dimensional back surface shape of said three dimensional molded body; and transforming said non-foamable liquid urethane into a solid body and fixing said solid body as said non-foamable urethane layer on said back surface of said surface material and said backing material, by continuing said step of integrally pressurizing and compressing for a certain period.

4. A method of claim 3 wherein a thermoplastic film is laminated on a back surface of said surface material.

* * * * *

UNITED STATES PATENT AND TRADEMARK OFFICE
CERTIFICATE OF CORRECTION

PATENT NO. : 6,103,047
DATED : August 15, 2000
INVENTOR(S) : Taro Ogawa

It is certified that error appears in the above-identified patent and that said Letters Patent is hereby corrected as shown below:

Column 3,
Line 60, "along long" should read -- along line --.
Line 62, "accomadate" should read -- accommodate --.

Column 4,
Line 2, after "4(B)" insert -- is --.
Line 21, before "FIG. 1(B)" insert -- FIG. 1(A) and --.

Column 10,
Line 24, after "of" insert -- a --.

Signed and Sealed this

Eleventh Day of June, 2002

Attest:

JAMES E. ROGAN
*Director of the United States Patent and Trademark Office*

*Attesting Officer*